Patented Oct. 20, 1953

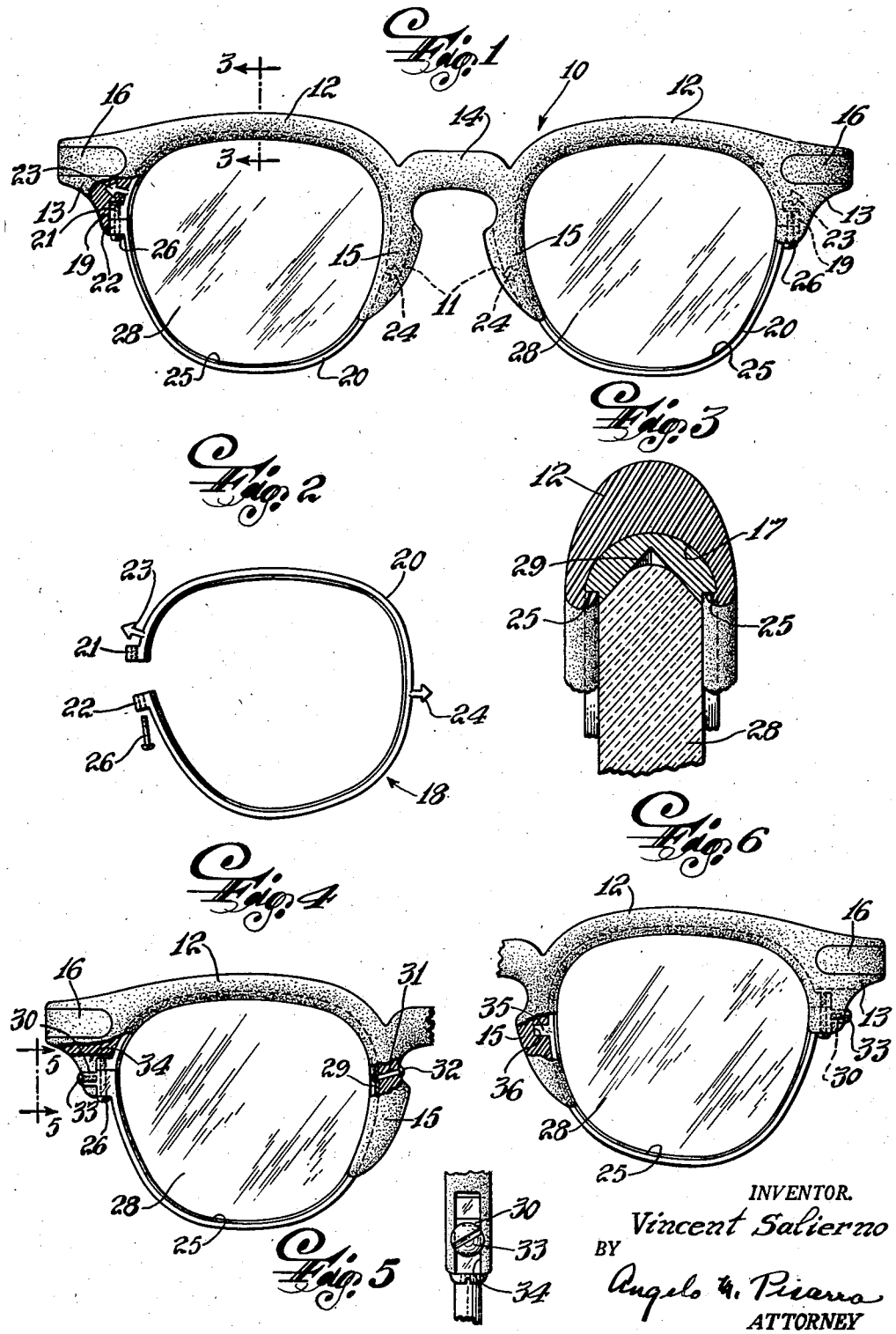

2,655,835

UNITED STATES PATENT OFFICE 2,655,835

SPECTACLE FRAME

Vincent Salierno, Belleville, N. J.

Application August 20, 1949, Serial No. 111,425

3 Claims. (Cl. 88—47)

This invention relates to ophthalmic mountings and more particularly to spectacle frames, the top arms or reaches of which are composed of a plastic material.

The main purpose of this invention is to provide novel spectacle frames having top arms composed of a plastic composition together with a lens receiving band or lens. The novel frames of this invention may be readily and easily produced at a reasonably low cost and are of rugged construction and design.

These as well as other objects and advantages of this invention will be readily apparent from the following description taken in conjunction with the appended drawings, wherein:

Fig. 1 is a front view of a spectacle frame embodying the invention.

Fig. 2 is a front view of the lens receiving band, shown in Fig. 1 and illustrates the condition of the lens receiving band before assembly and also shown the lock-screw in disassembly.

Fig. 3 is an enlarged cross-sectional view taken on line 3—3 of Fig. 1.

Fig. 4 is a fragmentary view essentially in front elevation and broken away, partly in section, and illustrates modifications of the anchoring and positioning means shown in Fig. 1.

Fig. 5 is a side view taken on line 5—5 of Fig. 4.

Fig. 6 is another modification of the anchoring and positioning means shown in Fig. 1.

As shown in the drawings, the novel spectacle frames of this invention comprise a spectacle front 10 composed of a plastic material and preferably one of the thermoplastic nature, such as zylonite or the like. The front 10 is of the common type generally known to the art as the top arm or semi-rimless frame. The front 10 is usually a single unitary element having a pair of nose pads 11 adhesively secured thereto. The front 10 comprises a pair of top arms 12 terminating at their outer ends in end pieces 13 and connected to each other at their opposing inner portions by bridge 14, and terminating in opposite nose pieces 15 diverging from each other and carrying the inwardly extending nose pads 11. Temples (not shown) are hingedly secured to the upper part of the end pieces 13 by hinges, the front parts 16 of which are shown.

According to this invention the lower or inner periphery of the front-piece 10 is recessed throughout the entire length thereof to provide a groove or slot 17 for receiving a lens-holder band 18. The end of the slot 17 at the lower part of the end piece 13 is further recessed to provide an enlarged groove or recess 19 to receive the enlarged joint of the band 18.

As shown in Figs. 2 and 3, the novel band comprises a narrow somewhat flexible metallic band lens holder 20. The holder 20 is of any desired shape and in the form of a split-ring whose upper part conforms to the general configuration of the inner periphery of ends 13, nose pieces 15 and arms 12 of front 10. The ends of the band 20, which are normally apart from each other, have joint members or lugs 21 and 22 integral therewith, with the normally upper lug 21 being internally threaded. Disposed just above the upper lug 21 and integral with band 20 is an outwardly extending anchor and positioning member 23 in the nature or form of a thin, yet rigid pin or arrow shaped element as shown. The member 23 is disposed in such a position on the band 20 so that in the complete frame assembly it projects into the end piece 13 of the front 10. Also integral with band 20 and extending outwardly therefrom is a like anchor and positioning member 24. The member 24 may be disposed at the other side of band 20 and in such position that upon frame assembly it extends into the nose piece 15. The band 20 has a lock groove 25 extending around each of the inner sides thereof around the entire length thereof.

In the assembling of the novel frame shown in Fig. 1, the front element 10 is laid flat-wise, then the band structure shown in Fig. 2 is coupled therewith by first positioning the band properly and inserting the prong 24, which may have been first heated, into the nose piece 15, while the end piece 13 is sprung out by hand. Then the end piece 13 is pressed towards the band, whereby anchor prong 23, which also may have been heated, becomes inserted in the end piece 13 and the band is located in the groove 17 which extends beyond the inner limits of band 20. Then the edges of the plastic member 10, which also may be first softened, are lapped over and into the grooves 25 to firmly lock and retain the band 20 in rigidly coupled relationship thereto. In this embodiment, the upper lug 21 is located in the upper part of recess 19 and the lower lug 22 in the lower part thereof. A lens may be coupled therewith by first removing the lock-screw 26, whereupon the band 20 separates; a lens 28 may be inserted in the inner lens receiving groove 29 of the band 20. Then the lug 22 is moved up to lug 21 to firmly couple the lens 28 to band 20 and the screw 26 inserted through lug 22 and threaded in lug 21 to lock the ends of band 20 together to hold and anchor the lens thereto. Of course, two bands such as shown in Fig. 2 are employed, with one coupled to each of the arms 12.

Instead of employing the construction shown in Fig. 2, I may employ a construction the same in all respects as that shown in Fig. 2, except that the prongs are eliminated and in their place, there is a rivet accommodating opening through band 20, and the lug 22 has an outwardly extending threaded lug 30 integral therewith. For this type of band construction, as shown in Fig. 4, each end piece 13 has an open end slot 34 through the side thereof communicating with the groove 19. In assembly, the lug 30 is inserted in the side opening of end piece 13 and the lug 21 fitted into groove 19 and the band is fitted in groove 17. Then a rivet 31 is inserted through the opening in band 20 and an opening through the upper part of piece 15 and is peened over at 32 to firmly lock the band to front 10. A screw 33 makes threaded engagement with lug 30 and bears against the outer surface of end piece 13 to lock the band to the front 10. The edges of the front are lapped over into grooves 25 as before and the lenses may be added thereto in the same manner as before described.

In the embodiment shown in Fig. 6, the same construction as that shown in Fig. 4 may be used except that in this instance a lug 35 fits into a preformed opening 36 in the piece 15. This modification shown in Fig. 6 is exactly the same as that shown in Fig. 4, except that the lug 35 integral with the band is employed in place of the rivet 31.

It is also within the purview of this invention to have the slots or grooves 25 extend only along that portion of the band 20 which is to be lapped therein by the plastic front; and to eliminate completely the anchors and positioning means 23 and 24 of Figs. 1 and 2, 31 of Fig. 4 and 35 of Fig. 6. I have found that I may obtain a satisfactory, although not quite so rugged, spectacle frame by eliminating said anchoring and positioning means. If desired, the shoulders of grooves 25 may be notched transversely or knurled so that upon pressing of the plastic material thereon it will be locked into the notches and knurling. Even without any notching or knurling of the shoulders of said grooves 25 and without employing any anchoring means, the lapping of the ends of the front member into the inwardly extending slots or grooves 25 by the plastic material makes a satisfactorily tight and firm bond with the band 20 to lock the front 10 to the band 18. The lug 21 will serve as the positioning means when located up close to the upper end of the slot or opening 19.

While this invention has been described in detail, it is not to be limited to the exact construction shown, because it is subject to various change and modification within the spirit thereof.

I claim:

1. A spectacle frame comprising a semi-rimless plastic front element having 2 sets of members connected by a bridge, with each set including an arm, nose piece and end piece, each set having an inner groove therein for accommodating a part of the nasal side edge and the entire upper edge of a lens, a split-ring holder substantially completely encircling said lens, a portion of said split-ring holder located in said groove and extending along substantially the entire length thereof, the other portion of said split-ring holder enclosing the space between the end piece and nose piece, said first mentioned portion of said split-ring holder in said groove located entirely within the front and rear faces of said set, a pair of anchor pins spaced from each other and rigidly secured to said split-ring holder, said pins extending outwardly from said split-ring holder and being embedded in said front element to rigidly anchor said split-ring holder to said front element.

2. A spectacle frame comprising a semi-rimless plastic front element having 2 sets of members connected by a bridge, with each set including an arm, nose piece and end piece, each set having an inner groove therein for accommodating a part of the nasal side edge and the entire upper edge of a lens, a split-ring holder substantially completely encircling said lens, a portion of said split-ring holder located in said groove and extending along substantially the entire length thereof, the other portion of said split-ring holder enclosing the space between the end piece and nose piece, said first mentioned portion of said split-ring holder in said groove located entirely within the front and rear faces of said set, a pair of anchor pins spaced from each other and rigidly secured to said split-ring holder, said pins extending outwardly from said split-ring holder and being embedded in said front element to rigidly anchor said split-ring holder to said front element, said split-ring holder having a groove in each side thereof and extending substantially the full length thereof, the lower parts of said front element defining said first mentioned groove being lapped in said grooves of said split-ring holder.

3. A spectacle frame comprising a semi-rimless plastic front element having 2 sets of members connected by a bridge, with each set including an arm, nose piece and end piece, each set having an inner groove therein for accommodating a part of the nasal side edge and the entire upper edge of a lens, a split-ring holder substantially completely encircling said lens, a portion of said split-ring holder located in said groove and extending along substantially the entire length thereof, the other portion of said split-ring holder enclosing the space between the end piece and nose piece, said first mentioned portion of said split-ring holder in said groove located entirely within the front and rear faces of said set, a pair of anchor pins spaced from each other and rigidly secured to said split-ring holder, said pins extending outwardly from said split-ring holder and being embedded in said front element to rigidly anchor said split-ring holder to said front element, a lug secured to each end of said split-ring holder, said end piece having a groove extending through the bottom face thereof for accommodating said lugs when in adjacent position and permitting lug insertion and locking and unlocking of said lugs.

VINCENT SALIERNO.

References Cited in the file of this patent

UNITED STATES PATENTS

| Number | Name | Date |
|---|---|---|
| 1,457,608 | Schumacher | June 5, 1923 |
| 1,600,605 | Stevens | Sept. 21, 1926 |
| 1,613,202 | Schumacher | Jan. 4, 1927 |
| 2,155,693 | Tanasso et al. | Apr. 25, 1939 |
| 2,284,630 | Banks | June 2, 1942 |
| 2,329,100 | Chappell | Sept. 7, 1943 |
| 2,355,053 | Carlson | Aug. 8, 1944 |

FOREIGN PATENTS

| Number | Country | Date |
|---|---|---|
| 463,000 | Great Britain | Mar. 19, 1937 |